United States Patent [19]

McClure et al.

[11] Patent Number: 4,834,303
[45] Date of Patent: May 30, 1989

[54] SHARPENING APPARATUS FOR FORAGE HARVESTER KNIVES

[75] Inventors: John R. McClure, New Holland; Mark K. Chow, Leola, both of Pa.

[73] Assignee: Ford New Holland, Inc., New Holland, Pa.

[21] Appl. No.: 209,127

[22] Filed: Jun. 17, 1988

[30] Foreign Application Priority Data

Apr. 21, 1986 [EP] European Pat. Off. ........ 86302999.7

[51] Int. Cl.$^4$ .............................................. B02C 18/06
[52] U.S. Cl. ..................................... 241/101.2; 51/249
[58] Field of Search .................. 51/246, 249, 247, 252; 241/101.2; 56/250

[56] References Cited

U.S. PATENT DOCUMENTS

| | | | |
|---|---|---|---|
| 1,738,005 | 9/1926 | Holm et al. | |
| 3,370,628 | 2/1968 | Waldrop | 51/246 |
| 4,005,554 | 2/1977 | Campbell | 51/249 |
| 4,010,576 | 3/1977 | Nissen | 51/249 |
| 4,019,287 | 4/1977 | Goering et al. | 51/249 |
| 4,192,103 | 3/1980 | Sousek | 51/249 |
| 4,495,734 | 1/1985 | Rauch | 51/249 |

FOREIGN PATENT DOCUMENTS

| | | |
|---|---|---|
| 3150614 | 1/1985 | Fed. Rep. of Germany . |
| 601287 | 11/1945 | United Kingdom . |
| 1223030 | 2/1968 | United Kingdom . |
| 2028191 | 8/1979 | United Kingdom . |
| 0195957 | 3/1986 | United Kingdom . |
| 2173749 | 10/1986 | United Kingdom . |

Primary Examiner—Roscoe V. Parker
Attorney, Agent, or Firm—Darrell F. Marquette; Frank A. Seemar; Larry W. Miller

[57] ABSTRACT

A forage harvester having an automatic grinding mechanism for the knives of the cutterhead, the grinding mechanism comprising a carriage carrying grinding means and being reciprocated back and forth across the cutterhead in the griding mode by endless drive means. The carriage is coupled to the endless drive means by a coupling member which is attached to the endless drive means chain and pivotally attached to the carriage. The coupling member is shaped and dimensioned such that the pivot axis of the connection to the carriage is substantially coaxial with the axis of rotation of each of the two sprockets which define the extent of the two runs of the endless drive means when the connection of the coupling member to the chain passes around that sprocket in moving from one run of the chain to the other. The drive means is provided with control means having means for commanding the termination of the grinding mode, and carriage-position-sensing means operable to deenergize the drive means at the end of the grinding mode such as to dispose the carriage in substantially the same home position at the end of each grinding mode irrespective of the position of the carriage at the instant of commanding termination of the grinding mode.

7 Claims, 5 Drawing Sheets

SHARPENING APPARATUS FOR FORAGE HARVESTER KNIVES

CROSS REFERENCE TO RELATED APPLICATION

This application is a substitute for U.S. patent application Ser. No. 027,462 filed Mar. 18, 1987, now abandoned.

BACKGROUND OF THE INVENTION

This invention relates to forage harvesters and more particularly to automatic sharpening or grinding apparatus for the knives of the cutterhead.

A number of known forage harvesters fitted with knife sharpening means require a grinding stone to be reciprocated manually back and forth across the rotating cutterhead and this is a very arduous and time-consuming task resulting in operator fatigue and unacceptable downtime of the machine. In other known forage harvesters, such as Great Britain Pat. No. 2,028,191 and U.S. Pat. No. 4,010,576 there are disclosed automatic sharpening mechanisms for forage harvesters in which grinding stones are automatically driven or reciprocated back and forth across the respective cutterheads. In both cases, reciprocation is effected by drive chains which extend around sprocket pairs. As the chains travel around sprockets a coupler is changed from one linear run to another to impart reciprocal retilinear movement to respective carriages.

The disadvantage of these arrangements is that the grinding stones have to be pivoted towards the cutterheads when grinding is required, and then pivoted away on completion of grinding so as to move the stones clear of the cutterheads for normal operation of the forage harvester. Thus the carriage has to be arranged for automatic or manual reciprocatory movement as well as manual pivotal movement and this makes for relatively cumbersome arrangements. Also at least part of the grinding stones remain engageable by the cutterhead knives during the changeover in movement of the carriages from one direction to the opposite direction.

The present invention provides a forage harvester comprising a rotatable cutterhead provided with a plurality of knives the tips of which describe the periphery of a cylinder when the cutterhead is rotated, a grinding mechanism comprising a carriage carrying grinding means and being reciprocable, in the grinding mode, across the cutterhead with the grinding means translating along a line on said cylinder generally parallel to the axis of rotation of the cutterhead, and drive means coupled to the carriage for effecting reciprocatory movement of the latter, the drive means comprising an endless member extending around at least two guide members arranged with their centers on a common line, generally parallel to the axis of rotation of the cutterhead characterized in that the drive means is provided with control means having means for commanding the termination of the grinding mode, and carriage-position-sensing means operable to deenergize the drive means at the end of the grinding mode such as to dispose the carriage in substantially the same position at the end of each grinding mode irrespective of the position thereof at the instant of commanding termination of the grinding mode.

The carriage-position-sensing means may comprise an electric switch which is so disposed as to be operable by the carriage each time the latter returns to the home position, and the command means comprises a timer, the arrangement being such that when the timer runs out, the carriage is not brought to rest until the position sensing switch has been actuated by the carriage next returning to the home position and thus being arrested in that position. Preferably, the drive means may comprise an electric motor controlled by first relay contacts such that when it is deenergized it is connected on both sides to ground, whereby it is brought to rest substantially instanteously so as to ensure that the home position of the carriage is always the same. The home position of the carriage is disposed beyond an associated side wall of a housing for the cutterhead such that, when the carriage is positioned in the home position, the grinding means is spaced from the cylinder described by the tips of the knives when the cutterhead is rotated.

BRIEF DESCRIPTION OF THE DRAWINGS

A forage harvester in accordance with the present invention will now be described in greater detail, by way of example, with reference to the accompanying drawings, in which.

DETAILED DESCRIPTION OF THE PREFERRED EMBODIMENT

Referring first to FIGS. 1 to 5, the forage harvester in which the invention is embodied comprises a main frame 1 on which are mounted ground-engaging wheels 2 and 3 and which is fitted with a corn header 4 (shown in phantom) although this could be replaced by a conventional crop pick-up device or by a conventional cutterbar depending on the crop to be harvested. The forage harvester includes upper and lower forward feed rolls 5 and 6 followed by upper and lower rear feed rolls 7 and 8 which operate to feed crop material from the header 4 into a conventional cutterhead 9, the knives 10 of which cooperate with a fixed shearbar 11 fitted on the lower edge of a cutterhead inlet opening. The outlet of the cutterhead housing communicates with the inlet of a blower 12, the outlet of which is fitted with the normal discharge spout 13 which can be positioned by the operator to direct the cut crop material as required, normally into a wagon which is moving alongside the harvester or in some instances is pulled behind the harvester.

Figure 5:
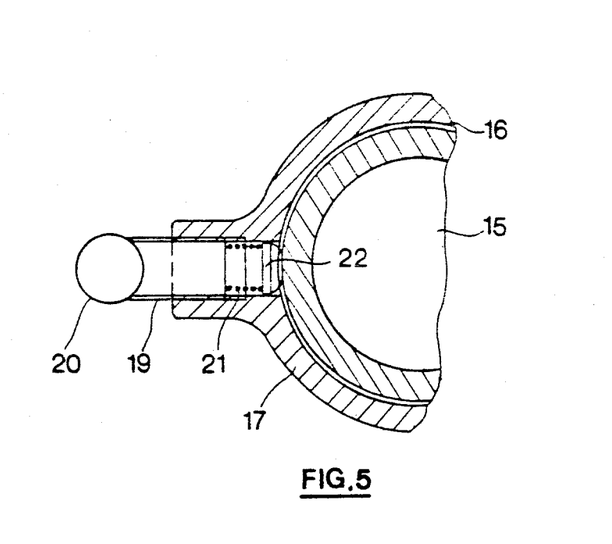
FIG. 5 is a sectional view taken along line V—V of FIG. 2.

The cutterhead 9 is fitted with a knife grinding or sharpening mechanism, indicated generally at 14, the main components of this device being conventional in as much as a solid cylindrical grinding stone 15 is adjustably mounted within a barrel 16 which is externally threaded and is received by a threaded aperture in a carriage 17 for the grinding stone. The upper end of the barrel 16 is fitted with a toothed indexing ring 18 and an aperture is provided through the carriage 17, the aperture being threaded and receiving a threaded rod 19 fitted with a handle 20. The rod 19 acts, via a spring 21, upon a plastic insert 22 and presses it into engagement with the external threads of the barrel 16 as best seen in FIG. 5. When the spring 21 is suitably compressed by rotating the rod 19 using the handle 20, the insert 22 is pressed on to the barrel threads so as to prevent inadvertent rotation of the barrel 16. This is important because one wants to avoid any variation in the position of the stone 15 either during the actual grinding operation or during the normal harvesting operation. This is because the setting of the stone 15 relative to the cutterhead knife blades 10 is critical and it does not want to be lower or higher than the set position. However, the action of the insert 22 is only to be such that is prevents inadvertent movement of the barrel 16 due to vibration but in no way should prevent the rotation of the barrel 16 as a result of the operation of the indexing mechanism for the stone 15 which is effected after every two strokes of the stone or carriage 17 relative to the cutterhead 9. This indexing mechanism comprises the indexing ring 18 already referred to and a trip device 23 (FIG. 3) which is mounted on one of the guide rails for the carriage 17 which will be referred to hereinafter. As the toothed ring 18 engages the trip member 23 every two strokes of the carriage 17, the ring 18, and hence the barrel 16, is rotated substantially one tooth width and thus the stone 15 is moved downwardly by a small distance relative to the cutterhead 9 so as to compensate for wear of the stone during the sharpening or grinding action of the last two strokes of the mechanism. This indexing arrangement is conventional.

The carriage 17 is cast from metal and has a collar 24 which receives a guide rod 25 of circular cross-section via bearings (not shown) which facilitate movement of the carriage back and forth along this guide rod. A second guide 26 in the form of a rail or strip of metal of rectangular cross-section is provided and a roller 27 is provided on the carriage 17 to engage the underside of the guide rail 26. A guide plate 28 is provided on the carriage 17 and slidably engages the top of the guide rail 26. A circular guide rod 25 with a rectangular guide rail 26 is used so as to accommodate any manufacturing tolerances or misalignments due to wear which might arise and which might spoil any parallel relationship between two circular guide rods and thus provide a sticking point for the carriage as it moves back and forth. Again, this is a conventional arrangement. The rectangular guide rail 26 is mounted on the sidewalls 29 of the cutterhead housing by respective L-shaped brackets 30, whereas the circular guide rod 25 is mounted on L-shaped brackets 31 equally attached to the side walls 29. It will be seen from FIG. 3 that the trip mechanism 23 is mounted on a support 32 which is attached to the guide rail 26.

A D.C. motor 33 is mounted on a bracket 34 attached to one of the brackets 31 and an output shaft 35 of the motor carries a sprocket 36 which is connected via a chain 37 to a sprocket 38 mounted on a stub shaft 39 journalled in the bracket 34 and carrying a further sprocket 40 below the bracket 34, which sprocket 40 receives a chain 41 extending around a second sprocket 42 mounted on a stub shaft 43 journalled in a support bracket on the corresponding bracket 31. It will be seen that the chain 41 extends across the full width of the cutterhead 9, with the sprockets 40 and 42 being disposed outside the respective sidewalls 29 of the cutterhead housing and defining the extent of the two runs of the chain.

The chain 41 is coupled to the carriage 17 via a coupling member 44 which is a cast L-shaped member the outer end of one limb of which is attached between two links of the chain 41 (as shown most clearly in FIG. 4) with the other limb of the coupling 44 being pivotally attached to the carriage 17, more specifically to the collar 24 of the carriage. This pivotal attachment of the coupling 44 is by way of a bolt 45 and it should be noted that the pivot axis afforded by this bolt is substantially co-axial with the axis of rotation of the sprockets 40 and 42 when the carriage 17 is at one end or the other of a stroke. In the intermediate positions, the pivot axis afforded by the bolt 45 is parallel to the axes of rotation of the sprockets 40 and 42 and actually tracks or follows a line joining the centers of these two sprockets. This is a requirement because as the coupling 44 move around sprockets 40,42 when it reaches the same so as to undergo arcuate movement to move from one run of the chain 41 to another, bearing in mind that the chain moves continuously in one end and the same direction, movement must not be imparted to the carriage 17 and lost motion is necessary. Once the coupling 44 has moved from one run of the chain 41 to the other, it again acts upon the carriage 17 and moves the latter back across the cutterhead 9 for its next grinding stroke.

An electrical switch 46 is disposed adjacent the lower end of the barrel 16 at the side of the machine at which the motor 33 is disposed, the switch having a plunger as an actuating member, the plunger being fitted with a roller 47 for engagement with the lower end of the barrel 16 when the latter is indexed towards the switch to an extent such that it can engage the roller. When this occurs, the switch 46 is opened so as to energize an audible warning as well as an optical warning that the stone 15 needs readjusting relative to the barrel 16. This is a safety feature to ensure that the barrel 16 cannot be indexed further so as to engage the knives 10 of the cutterhead 9 which would be disastrous. When stone adjustment has to be carried out, the barrel 16 is rotated in a direction opposite to the indexing movement and the stone 15 is moved further into the barrel so as to expose a certain length of stone for further grinding operations. This is a conventional adjustment, the stone 16 being held by deformable rings within the barrel 16 and these are first released so as to be able to move the stone relative to the barrel and then deformed once more so as to reengage and grip the stone.

A further electrical switch 48 is provided adjacent the collar 24 of the carriage 17 at the side of the machine at which the motor 33 is disposed and is actuated by an extension 49 on that collar, whereby it constitutes a carriage position sensor. Each time the carriage 17 returns to the side of the machine at which the motor 33 is disposed, the switch 48 is actuated and this is so as to ensure that the carriage is always returned to this extreme position when a grinding operation has been completed. Further details of this operation will be given with respect to the circuit diagram of FIG. 6.

Before a knife sharpening or grinding operation can be carried out, it is necessary first to remove part of the cutterhead housing so as to be able to gain access to the knives 10 of the cutterhead 9 with the grinding stone 15. The cutterhead housing comprises a movable portion 50 (FIG. 2) which is slidable in an arcuate path relative to the remainder of the housing, sliding movement being effected by a shaft 51 which is attached to a handle 52 for rotating the shaft, the shaft carrying two sprockets or gear wheels 53 which engage respective series of slots 54 provided in the cover portion 50. Thus, on rotation of the shaft 51 by the handle 52, the gears or sprockets 53 rotate but since the shaft 51 is held stationary, then the teeth thereof engage the associates slots 54 and operate on the sides thereof to move the cover portion 50 relative to the remainder of the housing. Thus, an opening is created through which the stone 15 can gain access to the knives 10 of the cutterhead 9. It will be appreciated that once a grinding operation has been finished, the cover portion 50 must be replaced by rotating the shaft 51 in the opposite direction in order to reclose the cutterhead housing, otherwise crop material, dirt, etc., would be thrown therethrough and also, access could be gained to the rotating cutterhead 9 which would be potentially extremely dangerous.

Figure 1:
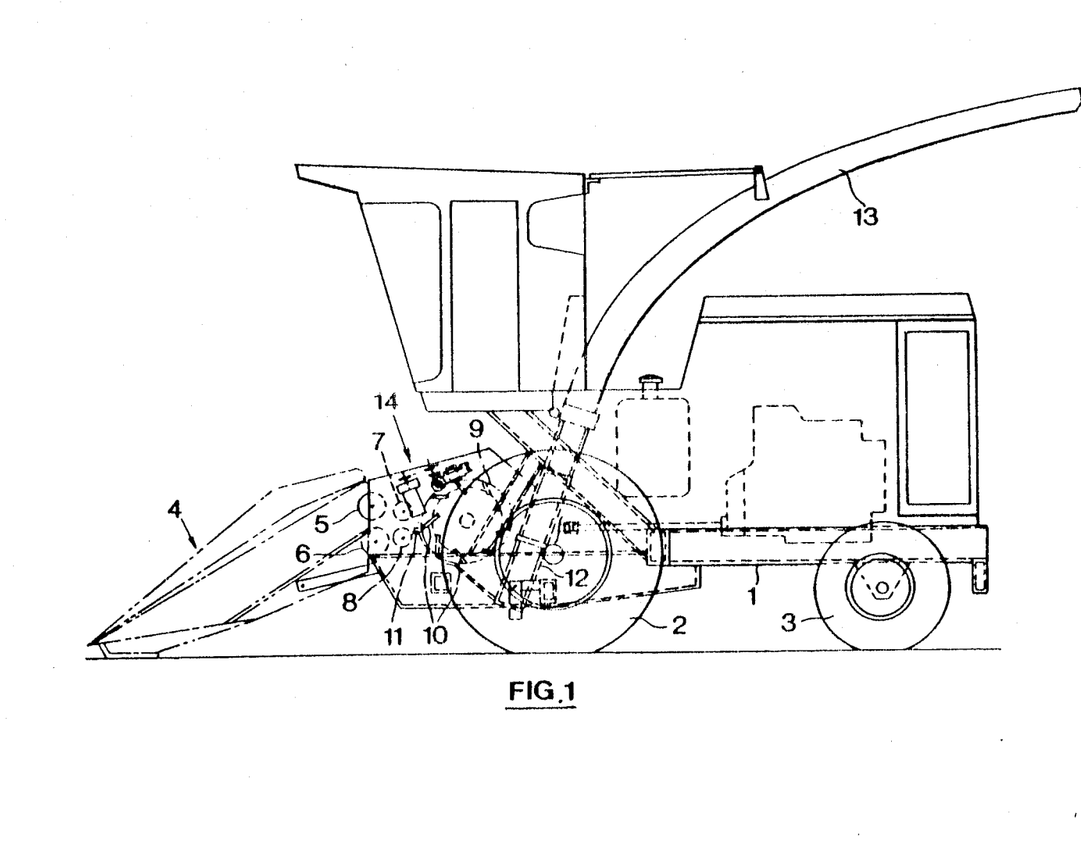
FIG. 1 is a diagrammatic side view of a forage harvester in which the invention is embodied.
Figure 2:
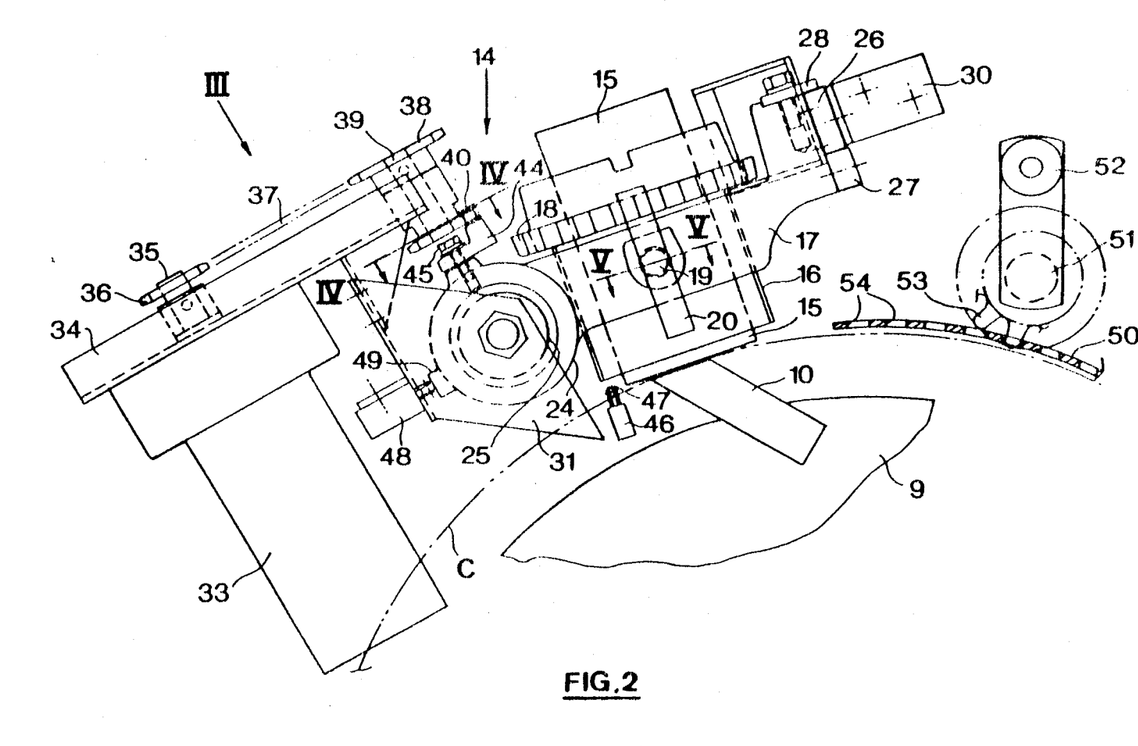
FIG. 2 is an enlarged view of the portion of the forage harvester in FIG. 1 wherein the invention is embodied.
Figure 3:
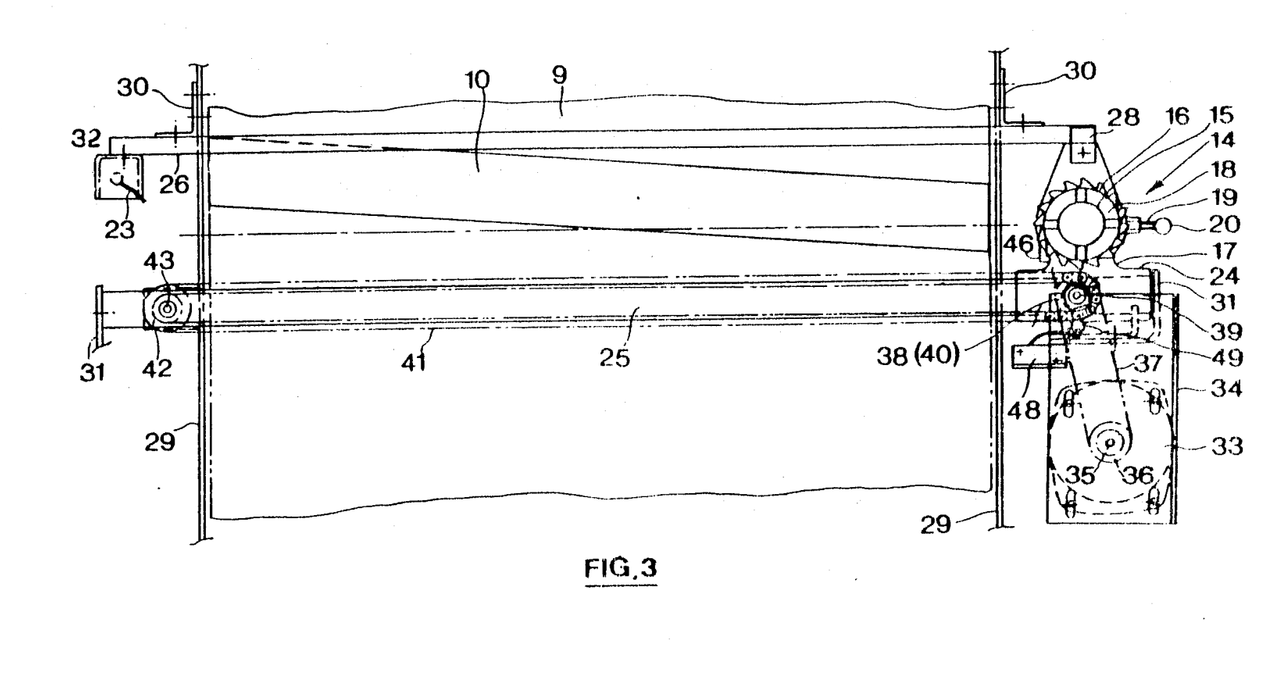
FIG. 3 is a view in the direction of arrow III of FIG. 2 to a reduced scale.
Figure 4:
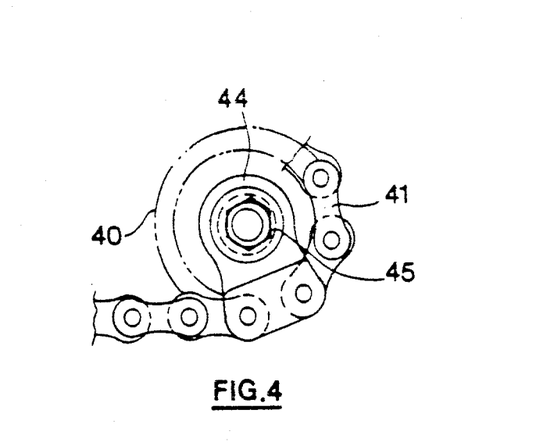
FIG. 4 is a sectional view taken along line IV—IV of FIG. 2.

When the motor 33 is energized (the precise procedure for this will be described hereinafter with respect to the circuit diagram of FIG. 6), the output shaft 35 is continuously rotated in one direction, whereby the sprocket 36 is driven in the same direction and thus drives the chain 37 continually. In turn, the sprocket 38 is driven by the chain 37 and this rotates the stub shaft 39 and hence the sprocket 40 mounted thereon. The sprocket 40 thus drives the chain 41 continuously and in the same direction with the sprocket 42 serving as an idler. As soon as the chain 41 is driven, it carries with it the coupling 44 and thus the carriage 17 is moved from the home or park position which is that illustrated in FIG. 3, across the cutterhead 9 (to the left as seen in FIG. 3), whereupon the knives 10 engage the sharpening stone 15 (as the cutterhead rotates), whereby they are ground or sharpened. The carriage 17 continues to move across the cutterhead 9 until the coupling 44 reaches the sprocket 42 and it then has to pass therearound so as to move from one run of the chain to the other. As the coupling 44 is moving around the sprocket 42, no movement of the carriage 17 takes place as already explained but because the stone 15 is located outside of the cutterhead housing sidewall 29, then there is no contact between the still rotating cutterhead knives 10 and the stone 15. Hence, this pause in the movement of the carriage 17 is of no consequence. As soon as the coupling 44 has traveled around the sprocket 43, it then proceeds to move along the opposite run of the chain 41 and thus carries the carriage 17 back acoss the cutterhead 9 to its original position, again the knives 10 engaging the stone 15 during this return pass of the carriage. As the coupling 44 returns to the sprocket 40, the extension 49 on the carriage collar 24 actuates the switch 48 although this does not necessarily deenergize the motor 33 as will be explained later. The coupling 44 then proceeds to pass around the sprocket 40, assuming there is another pass of the stone to be made, the carriage 17 again pausing while this movement of the coupling around the sprocket 40 takes place. Thus the coupling 44 moves back to its original run of the chain 41 and then commences to take the carriage 17 back across the cutterhead 9, and so on. This continual movement of the grinding stone 15 back and forth across the cutterhead 9 continues until such time as the grinding operation is to be stopped.

When the carriage 17 undergoes the first described traverse across the cutterhead 9, the trip device 23 will engage a tooth of the indexing ring 18 and thus rotate that ring through approximately one tooth width and hence index the stone barrel 16 so as to move the operative face of the stone 15 slightly closer to the cylinder (seen as a circle C in FIG. 2) described by the tips of the knives 10, the stone 15 traversing a line on the periphery of the cylinder substantially parallel to the axis of rotation of the cutterhead 9. This indexing operation occurs everytime the carriage 17 moves to the left-hand side (as seen in FIG. 3 of the drawings), i.e., at the end of every two strokes of the grinding mechanism. It will be appreciated that the carriage 17 is supported in this translational movement back and forth across the cutterhead 9 by virtue of it being mounted on the guide rod 25 and guide rail 26.

The control of the grinding or sharpening procedure will now be explained with reference to FIG. 6. The control circuit is energized from the 12 volt battery of the harvester via a 15 amp circuit breaker 55, and a main power on/off switch 56 is provided which has an associated light 57 which is energized when the power is on. A relay 50 with a "normally open" contact and a "normally closed" contact is connected with its "normally open" contact to the common junction between the circuit breaker 55 and the switch 56. The "normally closed" contact of the relay contacts 58 is connected to ground (−V). The "pole" of the relay contacts 58 is connected to the motor 33. Another set of relay contacts 59 provided in parallel with a start switch 60 which is actuated when grinding or sharpening is to commence. A sharpening motor relay coil 61 controls the sharpener motor relay contacts 58 and a further coil 62 controls the "start sharpener" relay contacts 59, these two coils being connected in parallel, with a diode 63 also being connected in parallel therewith. Mounted in parallel with the home or park switch 48 is a timer switch 64' of a timer 64 which itself is in series with the parallel arrangement of the relay contacts 59 and the start switch 60. An audible buzzer 65 and a visual warning light 66 (already referred to in general) are connected in parallel with each other and in series with one contact of the barrel sensor switch 46.

When it is required to sharpen the knives 10 of the cutterhead 9, the housing portion 50 is opened, as already described, and the switch 56 is then closed by the operator, whereby power is connected to the switch 46 which is normally closed and thus power is applied to the common junction 67 between the timer switch 64' and the switch 48 which is open when the stone is in the home or park position. Thus, power cannot be transmitted through either the timer switch 64' or the switch 48 and thus cannot energize the relay coils 61 and 62, whereby the motor 33 at this stage cannot be energized. Even when the operator sets the timer 64 to a required period of grinding or sharpening and renders it operative so as to close the timer switch 64', power can only be taken from the switch 46 through to the junction 68 of the switch 60 and the "normally open" contact of the relay contacts 59.

Figure 6:
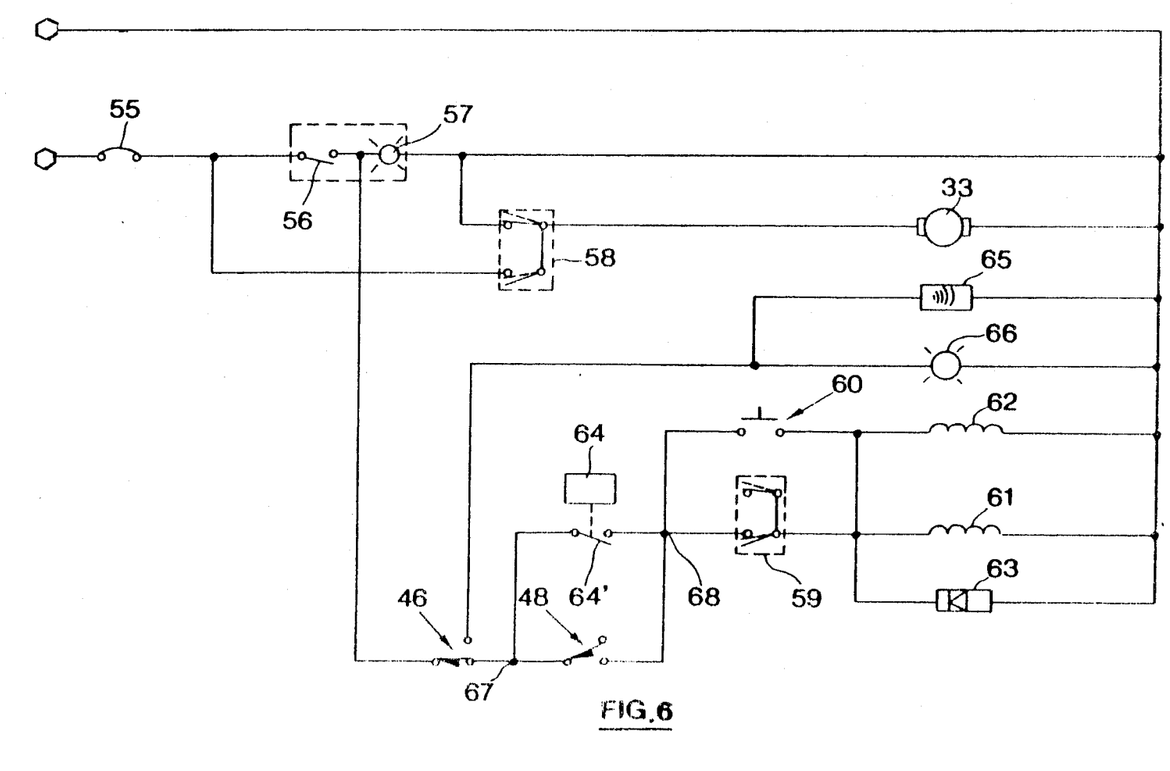
FIG. 6 is a circuit diagram illustrating the operation of the automatic grinding or sharpening mechanism of the forage harvester.

Accordingly, it is not until the start switch 60 is closed that power is delivered to the relay coils 61 and 62, whereupon the respective contacts 58 and 59 are changed over to the broken line positions of FIG. 6. Once the coils 61 and 62 have been energized, then the motor 33 is energized and the carriage 17 is reciprocated back and forth as already described. At this stage, the start switch 60 need not be held closed because the relay contacts 59 are now in a position to deliver power therethrough to the relay coils and hence maintain them energized. As long as the timer 64 is operative, whereby the switch 64' associated therewith is closed, then it does not matter whether the switch 48 is open or closed. The switch 48 is, in fact, closed once the carriage 17 has moved from the home or park position and is then opened when it returns to that position but, because the switch is in parallel with the timer 64, this has no effect as regards delivering power or interrupting power to the relay coils 61 and 62. However, once the timer 64 has run out, then the switch 64' associated therewith goes open circuit so as to command termination of the grinding mode. However, assuming the carriage 17 is not in the home or park position at the instant of the opening of the timer switch 64', then the switch 48 is closed and thus the relay coils 61 and 62 remain energized and hence the motor 33 continues to run. This status of the control means will remain until the carriage 17 is returned to the home or park position, whereupon the switch 48 is opened and thus the relay coils 61 and 62, and hence the motor 33, are deenergized. This arrangement is to ensure that the carriage 17 is always returned to the home or park position irrespective of the position thereof when the timer 64 runs out.

It will be observed that the upper contact of the relay contacts 58 is connected to the vehicle ground (−V) and thus connects one side of the motor 33 to ground when the upper contact is closed which is when the relay coil 61 is deenergized. The other side of the motor 33 is permanently connected to vehicle ground. This arrangement is employed so that as soon as the motor relay coil 61 is deenergized, both sides of the motor 33 are at ground so as to arrest the motor virtually instantaneously to ensure repeatability of the home or park position of the carriage. If this were not done, the motor 33 would run on to some extent and hence vary the home or park position.

It should be noted that when the barrel 16 is indexed far enough so as to engage and operate the switch 46, the latter is then opened so that the buzzer 65 and warning light 66 are energized and the power supply to the timer 64 and the relay coils 61 and 62 is interrupted, whereby the motor 33 is immediately deenergized and arrested instantaneously as just explained, this being necessary to ensure that the barrel cannot be indexed further and hence moved into the path of the rotating knives 10. However, it should be noted that the switch 46 is only actuated by the barrel 16 and thus only when the latter is in the home or park position of the carriage 17 so that the interruption of power to the motor 33 is entirely consistent with the basic philosophy of parking the carriage in the home position at the end of a grinding operation. However, further sharpening cannot be effected until the stone 15 has been adjusted as has been described.

The handle 20 (see FIG. 5) is used in two modes, the first is to set the compression in the spring 21 so as to adjust it to keep the stone barrel 16 from rotating due to vibration, and the second is to hold the insert 22 hard against the barrel 16 so as to lock the same while the cap or indexing ring 18 is unscrewed from the barrel in order to release the deformable rings which engage the stone 15 so that the stone is freed and can be moved down the barrel 16 when adjustment is required.

It will be appreciated that the provision of the coupling member 44 having just a pivotal connection with the carriage 17 is superior to the known pin and slot arrangement in providing lost motion to the carriage while the coupling passes around the sprockets 40,42.

The pivotal connection is not subject to the wear occasioned by the pin and slot arrangement.

As regards the control of the grinding mechanism, this ensures that the grinding means is always positioned in one and the same place at the end of a grinding operation and when the grinding means requires adjustment, this position being in the normal path of reciprocable movement of the carriage, whereby no additional carriage movement in a different direction has to be effected. In as much as the motor 33 is powered from the vehicle or tractor DC supply, no special and external supply is required so that grinding can be carried out whenever it is necessary. The actual grinding operation is automatic, as described, and is controlled from the cab of the machine. The opening and closing of the cutterhead housing by way of moving the cover 50 can also be automated by arranging to drive the shaft 51 by a motor which can be controllable from the operator's cab. Alternatively, the cover 50 also can be driven manually from the operator's cab by a cable drive extending from the cab to the shaft 51, for example. Since the motor 33 is driven unidirectionally, no acceleration and deceleration forces are present due to motor reversal which would otherwise be required at the end of each pass or stroke of the carriage 17. Although the use of a DC motor 33 is described for the driving of the chain 41, this may be replaced by another endless drive member such as, for example, a belt extending around a pair of spaced apart guide pulleys.

As a precaution against motor failure, the shaft 43 of the sprocket 42 (or the shaft 39 of the sprocket 40) is provided with an hexagonal head to which a spanner, wrench, or the like, can be fitted and turned so as to drive chain 41 and hence move the carriage 17 back to the home position should the motor 33 fail when the carriage is positioned otherwise.

Having thus described the invention, what is claimed is:

1. In a forage harvester comprising:
   a rotatable cutterhead provided with a plurality of knives the tips of which describe the periphery of a cylinder when the cutterhead is rotated;
   a grinding mechanism comprising a carriage carrying grinding means and being reciprocable, in a grinding mode, across the cutterhead with the grind means translating a line on said cylinder generally parallel to the axis of rotation of the cutterhead; and
   drive means coupled to the carriage for effecting reciprocatory movement of the latter, the drive means comprising an endless member extending around at least two guide members arranged with their centers on a common line, generally parallel to the axis of rotation of the cutterhead;
   the improvement comprising:
   control means for said drive means including means for commanding the termination of the grinding mode and carriage-position-sensing means operable to deenergize the drive means at the end of the grinding mode so as to dispose the carriage in substantially the same home position at the end of each grinding mode irrespective of the position thereof at the instant of commanding termination of the grinding mode.

2. A forage harvester according to claim 1, wherein the carriage-position-sensing means comprises an electric switch which is so disposed as to be operable by the carriage each time the latter returns to the home position, and the command means comprises a timer, the arrangement being such that when the timer runs out, the carriage is not brought to rest until the position sensing switch has been actuated by the carriage next returning to the home position and thus being arrested in that position.

3. A forage harvester according to claim 2, wherein the drive means comprises an electric motor controlled by first relay contacts such that, when it is deenergized, it is connected on both sides to ground, whereby it is brought to rest substantially instantaneously so as to ensure that the home position of the carriage is always the same.

4. A forage harvester according to claim 1, wherein the home position of the carriage is disposed beyond an associated side wall of a housing for the cutterhead such that, when the carriage is in the home position, the grinding means is laterally spaced from the cylinder described by the tips of the knives when the cutterhead is rotated.

5. A forage harvester according to claim 2, wherein the command means and the position-sensing-means are connected in parallel, the position-sensing means normally passing electrical current and only being rendered open circuit when actuated by the carriage.

6. A forage harvester according to claim 1, wherein the grinding means is adjustably mounted in holding means which is movable with respect to the cutterhead to take up wear of the grinding means, and in that the control means further comprises means for detecting when the holding means is close to the cutterhead knife path and being operable to deenergize the drive means.

7. A forage harvester according to claim 6, wherein the detecting means comprises an electrical switch mounted on the machine in a position such that it is only actuatable by the holding means when the carriage is in the home position, whereby the carriage is always in that position when the drive means is deenergized by the detecting means.

* * * * *